United States Patent [19]

Nicolas et al.

[11] Patent Number: 4,557,292
[45] Date of Patent: Dec. 10, 1985

[54] SYSTEM FOR DISTRIBUTING PNEUMATIC CONTROL SIGNALS BY ELECTRICAL MEANS

[75] Inventors: Michel Nicolas, Plaisir; Pierre Prudhomme, Saint Germain en Laye, both of France

[73] Assignee: La Telemecanique Electrique, Nanterre, France

[21] Appl. No.: 469,599

[22] Filed: Feb. 24, 1983

[30] Foreign Application Priority Data

Feb. 24, 1982 [FR] France ............................. 82 03009

[51] Int. Cl.⁴ .......................................... F15B 13/08
[52] U.S. Cl. ........................ 137/596.16; 137/625.64; 137/625.66; 137/854; 137/884
[58] Field of Search ............. 137/269, 596.16, 625.64, 137/625.66, 854, 884, 885; 339/15

[56] References Cited

U.S. PATENT DOCUMENTS

| | | | |
|---|---|---|---|
| 2,913,000 | 11/1959 | Roberts | 137/854 |
| 3,126,915 | 3/1964 | Hunt | 137/625.64 X |
| 3,171,435 | 3/1965 | Lansky et al. | 137/596.16 |
| 3,215,158 | 11/1965 | Bass et al. | 137/596.16 X |
| 3,450,160 | 6/1969 | Tess | 137/625.64 |
| 3,513,876 | 5/1970 | Tarbox | 137/884 X |
| 3,995,654 | 12/1976 | Arvin et al. | 137/625.66 X |
| 4,167,200 | 9/1979 | Bouteille | 137/884 |
| 4,181,141 | 1/1980 | Stoll et al. | 137/884 X |
| 4,347,864 | 9/1982 | Bouteille et al. | 137/625.64 X |
| 4,415,004 | 11/1983 | Bouteille et al. | 137/884 |
| 4,469,128 | 9/1984 | Petrimaux et al. | 137/884 X |

FOREIGN PATENT DOCUMENTS

| | | | |
|---|---|---|---|
| 2504610 | 10/1982 | France | 137/884 |
| 65774 | 5/1980 | Japan | 137/625.64 |

Primary Examiner—Gerald A. Michalsky
Attorney, Agent, or Firm—William A. Drucker

[57] ABSTRACT

Stage for a system for distributing pneumatic control signals by electrical means, comprising a large number of associated stages. Each stage comprises a removable electrical valve (141) having an electro-magnet (33) of very low power, and a fixed socket (5) into which it fits: a pneumatic amplifier (57) is housed in the body (51), of the socket and feeds relatively large amounts of fluid to an outlet connector (26) when it is activated by the outlet of a low flow pneumatic switch (40); a non-return valve (88) protects the amplifier against pressure perturbations in the discharge duct (4). Numerous thin stages of a thickness close to 17.5 mm. can with advantage be used as an interface between a pneumatic installation (28) and a control center (24) supplying low level electrical signals.

7 Claims, 14 Drawing Figures

SYSTEM FOR DISTRIBUTING PNEUMATIC CONTROL SIGNALS BY ELECTRICAL MEANS

BACKGROUND OF THE INVENTION

The invention concerns a system for distributing pneumatic control signals by electrical means comprising a large number of distribution stages linked together and each consisting of:

A fixed socket the body of which contains: a portion of pressurized feed duct and a portion of discharge duct, an initial connecting device which is linked to a first terminal and to a second terminal capable of receiving from and transmitting to a neighbouring socket the voltage from a first pole of a power source, a second connecting device capable of receiving electrical control signals the potential of which comes from a second pole of this source.

A pneumatic connector capable of transmitting pneumatic control signals to an operating device the fluid of which comes from the pressurized feed and the flow of which is controlled by a removable electrical valve associated with the said body:

this electrical valve consisting of an electro-magnet the coil of which is connected to two pins matching the first and second connecting devices and also a pneumatic switch which is associated with the electro-magnet and which is capable of connecting an outlet orifice controlling the flow of the fluid either to a discharge orifice communicating with the portion of the discharge duct or to a pressure orifice communicating with the portion of pressurized feed duct.

THE PRIOR ART

A system having the general lay-out mentioned above and which is described in the French patent application No. 81 08230 (published under U.S. Pat. No. 2,522,085) lodged by the assignee is intended principally to match industrial installations using pneumatic power to the control centers in which the signals sent to them are generated by electrical or electronic means.

In this known system, the pneumatic switching devices in the electrical valve directly control the flow of the control fluid, which is intended for the user devices, through a metallic housing the size of which is defined mainly by the section of the pipes necessary for this fluid to flow and by the secondary function of cooling the coil of the electromagnet which is associated with the valve vane.

The power developed by these electro-magnets must therefore be relatively high owing first to the amplitude of the movements which must be communicated to the valve vane and, secondly, to the relatively large diameter of this vane, the surface of which is exposed to industrial pressures.

These electrical valves must therefore be powered either from signal processing centers fitted with relays or by electronic signal processing centers of which the output stages are fitted with electrical amplifiers.

The use of programmable electronic controllers which is now increasingly frequent for driving industrial plants of all kinds, is however not economic unless the devices connected to their outlets require only low level power signals.

The power of the electro-magnets in the electrical valves can however not be reduced below a certain limit beyond which the amounts of air supplied are insufficient to operate the industrial pneumatic equipment at the rate now currently required.

In cases where it is decided to use programmable electronic controllers, their rational use implies that most of their large number of outlets should be connected to a corresponding number of electro-pneumatic interface units.

The corresponding increase in space needed must be countered by a substantial reduction in the size of these interface units, although without reducing the dimensions below which the fluid flow passages would be too small.

The purpose of the invention is to provide a system of distribution by electrical means of pneumatic control signals in which the size of the component stages will be smaller than those previously existing, without the fluid flow rate being lower than that supplied by the stages previously used and in which the power consumed by the electro-magneto of the electrical valves in these stages will be sufficiently reduced for it to be possible for them to be excited directly by the low level outputs from programmable controllers.

OBJECT OF THE INVENTION

According to the invention, the declared objective is reached as a result of the fact that the socket comprises a pneumatic amplifier which is fed by the portion of pressurized feed duct and which comprises a flap device the movements of which are activated by the pressure at the outlet orifice of the pneumatic switch so as to connect the pneumatic connector either directly to this portion of the feed duct, or to the portion of the discharge duct.

BRIEF DESCRIPTION OF THE DRAWINGS

The invention and other measures aimed at producing complementary and related results will be better understood using the following description to which fourteen figures are attached.

On the attached drawing.

DESCRIPTION OF THE PREFERRED EMBODIMENT

Figure 1:
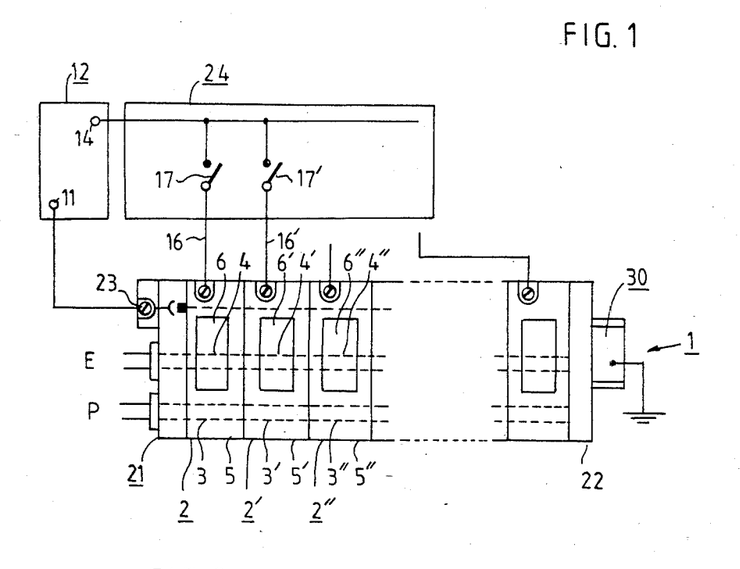
FIG. 1 diagrammatically shows a priorly known distribution system.

A system 1 for distributing pneumatic control signals by electrical means, already known and shown schematically in FIG. 1, consists of a large number of stages 2, 2', 2" ... side-by-side: each stage is fed under pressure from a common source P through a common pressurized feed duct formed by the juxtaposition of the portions of the feed duct 3, 3', 3" ... and each stage is also connected to a common discharge duct formed by the juxtaposition of the portions of discharge duct 4, 4', 4" ... these portions being placed longitudinally in identical sockets.

Figure 2:
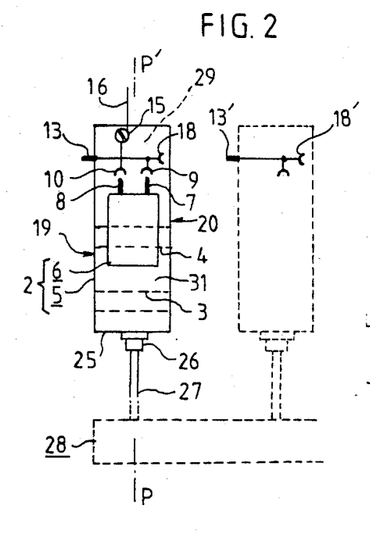
FIG. 2 gives a larger scale and schematic illustration of a stage of the system according to FIG. 1 which has the same external appearance as that according to the invention.

Each stage has a socket 5, 5', 5" ... and a removable electrical valve 6, 6', 6" ..., each of these having pins 7, 8 which match the electrical connectors 9, 10, carried by each socket (see also FIG. 2). These connectors are first of all 9, connected to a pole 11 of a voltage source 12 by a first terminal 13 and, secondly, 10 to a second pole 14 of this voltage source through a third terminal 15 of a conductor 16 and an electrical switch 17. The sockets transmit a common potential from one to the other which is that of pole 11 since each first terminal 13 is, internally, connected electrically to a second terminal 18 and since every terminal such as 18 works with a terminal such as 13' in a neighbouring stage, when these are associated when their opposite parallel faces 19 and 20 are brought together.

End fittings 21 and 22 are placed at the opposite ends of the stack of sockets, firstly so that one of them 22 closes off the common ducts and, secondly, so that the other one, 21, connects the ducts to the pressure source P and to a pressure reducer or discharge filter E. The end fitting 21 also carries a terminal 23 which is connected to terminal 13 of the first socket and to pole 11.

The electrical switches shown schematically by 17 may be mechanical or solid state and are located in a cabinet 24 which is normally remote from the installation to be driven. Each socket has a lower longitudinal face 25 which carries a pneumatic connector 26 connected by a flexible tube 27 to a special device on the installation 28, a rear face 29 which matches a mounting 30 and a front face 31 on which the electrical valve 6 is fitted.

In this system, all the coils in the electro-magnets, of the different electrical valves are permanently connected to pole 11 of the source 12 by means of pins such as 7 on the connectors such as 9 of the first and second terminals such as 13, respectively 18 and by the terminal 23; each electromagnet coil can be excited when the potential of pole 14 of the source appears on a third terminal, such as 15, following the closure of a special switch 17. The current flowing in a coil serves to excite the electro-magnet of the electrical valve concerned and an armature or core of this electromagnet activates a pneumatic switch located in the electrical valve and which is connected pneumatically to the socket so as to bring the pneumatic connector 26 into communication either with the pressure duct 3 or with the discharge 4.

The system according to the invention is externally similar to that which has been described in FIGS. 1 and 2 and the components having the same functions will carry the same reference numbers.

The electrical valve used in the invention differs from those already existing only in its dimensions, the power rating of its electro-magnet and in the flow of its pneumatic switch which are all appreciably smaller.

Figure 3:
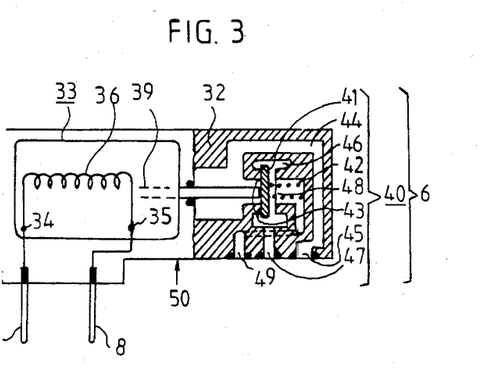
FIG. 3 is a section through the plane PP' of FIG. 2 of an electrical valve of the type which will be used in the invention.

Consulting FIG. 3 we see at 6 a removable valve the body 32 of which contains an electro-magnet 33 for example with a piston armature of which the ends 34 and 35 of the windings 36 are connected to projecting pins 7 and 8; a moving part 39 of this electro-magnet will activate; when the coil is excited or released, pneumatic valve 40. This carries a valve element 41, linked to a return spring 42 which gives it the rest position shown, where it closes an orifice 43. The valve element moves into a chamber 46 which is connected to an outlet orifice 47, to the orifice 43 connected by an internal duct 44, to a pressure duct 45 and also comprises an orifice 48, placed opposite the valve element which is linked through another internal duct to a discharge duct 49. When the electro-magnet is in the rest position, the end 39' connected to the moving part 39 of this electromagnet, is pushed back by the spring 42, thus allowing the valve element to block the orifice 43, so that the orifice 47 can be connected either to the orifice 49 in the rest position or to the orifice 45 otherwise, when the end 39' pushes the value element 41.

These three orifices 49, 47, 45 are all located on the same face 50 which carries the pins 7 and 8.

Figure 4:
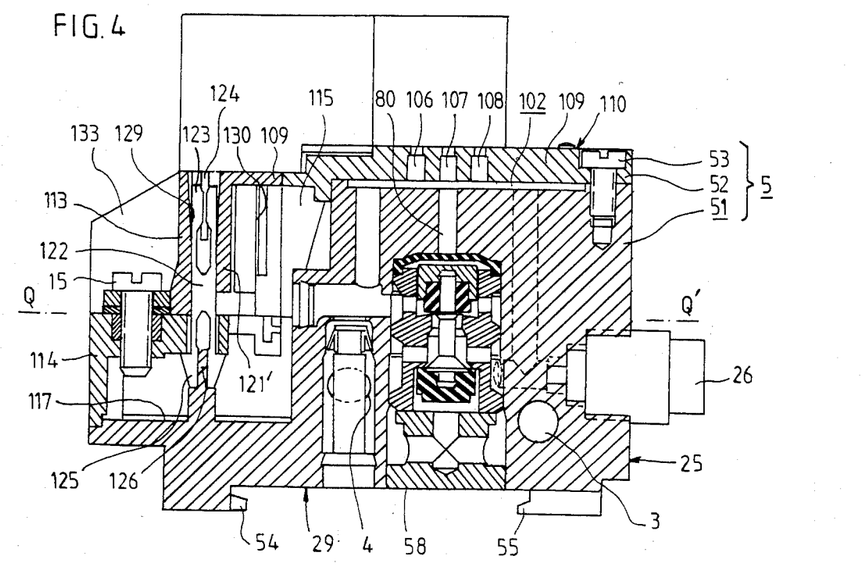
FIG. 4 gives a partial section through plane PP' of FIG. 2 showing a stage of the system according to the invention.

The socket 2; shown on FIG. 4, comprises a body 51 and a cover 52 fixed on the body, for example using bolts such as 53. The rear mounting face of this body 29 is fitted with hooks 54 and 55 which match the rail section 30, the lower longitudinal face 25 carrying the pneumatic connector 26, the portion of longitudinal pressure duct 3 and the portion of longitudinal discharge duct 4.

A pneumatic amplifier 57 is held by a sealed plug 58 in a cylindrical recess 56 (see FIG. 5) parallel to the faces 19 and 20 and opening on the rear face 29. The amplifier consists of a cylindrical body 59 on the outside of which (see FIG. 7) there are 3 annular ridges 60, 61, 62 one above the other and separated by two annular grooves 63 and 64; these grooves are pneumatically insulated from one another as a result of the radical compression of the ridges created when the body is pressed into the recess 56.

Figure 7:
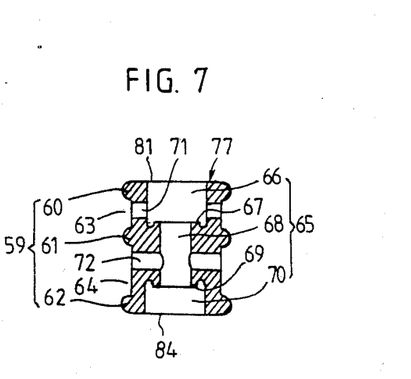
FIG. 7 illustrates, for greater clarity, the section through PP', of a housing belonging to a pneumatic amplifier placed in the socket according to FIGS. 4 to 7.

The body of the amplifier contains an internal recess 65 which passes through it co-axially and which contains a first chamber 66 separated by an orifice 67 from a second chamber 68 and an orifice 69 which separates the second chamber from a third chamber 70.

The first chamber 66 is connected by radial openings 71 and 72 to the first groove 63 and the second chamber 68 to the second groove 64. A rod 73, movable axially in the recess 56 has two ends provided with respective valve elements 74, 75 one of which, 75, moves in the third chamber 70 opposite the orifice 69 while the other one, 74, moves in the first chamber 66 opposite the orifice 67.

This rod can be moved axially towards the bottom of the figure, when a membrane 76, trapped around its periphery between an end 77 of the body 59 and a bottom 78 of the recess 56, is deformed and presses against an end 79 of the valve element 74 which then projects beyond this body through an opening 81 of chamber 66. This deformation may be caused by a pressure transmitted through a duct 80 between a membrane and the space 78 connected to it.

Figure 5:
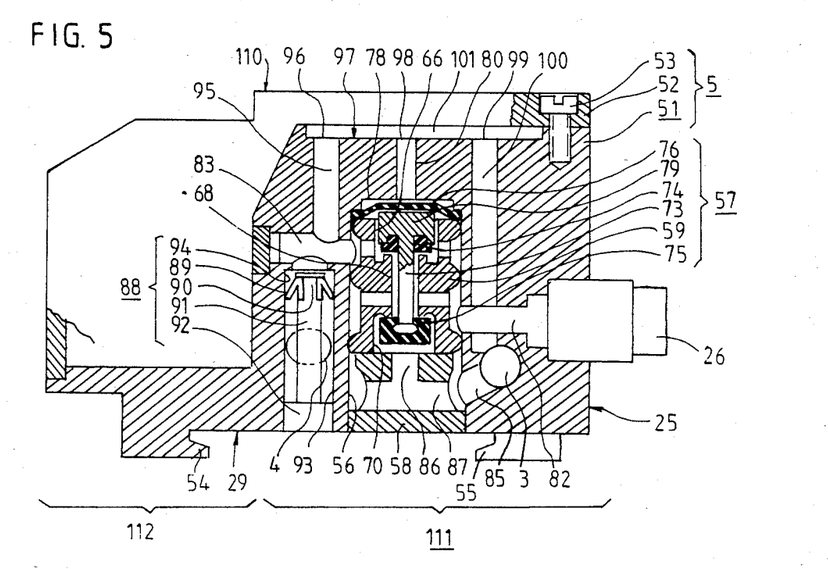
FIGS. 5 and 6 show a section through plane PP' of FIG. 2 showing details of two neighboring parts of a socket according to the invention.

The annular groove 64 is connected by a duct 82 to the pneumatic connector 26, the annular groove 63 is connected by a duct 83 to the portion of discharge duct 4, and an opening 84 which closes off the recess 65 and the chamber 70 is connected to the portion of pressurized duct 3, by a duct 85 which terminates in the said recess and by ducts 86, 87 of the plug 58.

A non-return valve 88 is placed between the duct 83 and the portion of duct 4 thus permitting a fluid to circulate into this portion of duct; this valve consists with advantage of an annular elastic skirt 89 located at one end 90 of a cylindrical support 91 the second end of which 92 acts as a plug in a cylindrical recess 93, which opens on face 29; this recess which is parallel to the faces 19 and 20 and which communicates with the duct 4 has a cylindrical surface 94 on which the annular skirt bears, the diameter of the support 91 being sufficiently less than the diameter of the recess in which it is located to allow easy passage of a discharge fluid.

The membrane 76 which is located at the side remote from the mounting surface 29, isolates the duct 80 and the duct 83 is connected by a duct 95 to an orifice 96 located on a surface 97 of the body 51 of the socket on the side remote from face 29.

On this same surface 97 terminates the duct 80 with an orifice 98 and, through an orifice 99, a duct 100 which is connected to the portion of pressurized duct 3. A wall 109 of the cover 53 is located opposite the surface 97 which forms the bottom of a rectangular recess 101 of shallow depth in which is placed a compressible seal 102 the thickness of which is slightly greater than the said depth, this recess being close to the membrane 76.

Figure 8:
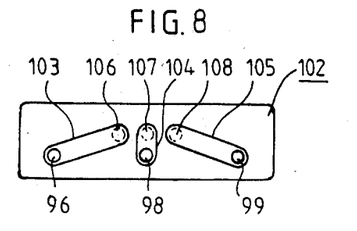
FIG. 8 shows a top view of a seal used in the socket.

In the thickness of this seal (see FIG. 8) are arranged ducts 103, 104 and 105, the opposite ends of which connect the orifices 96, 98 and 99 respectively to holes 106, 107, 108 which pass through the wall 109 of the cover; this wall exerts an elastic compression on the seal so that the connections are leak tight.

The wall 109 has an external surface 110 on which the surface 50 of the electrical valve 6 bears such that the orifice 45 is connected (and sealed to) the hole 108, that the outlet orifice 47 is connected (and sealed to) to the hole 107 and the discharge orifice 49 is connected (and sealed to) to hole 106.

Figure 9:
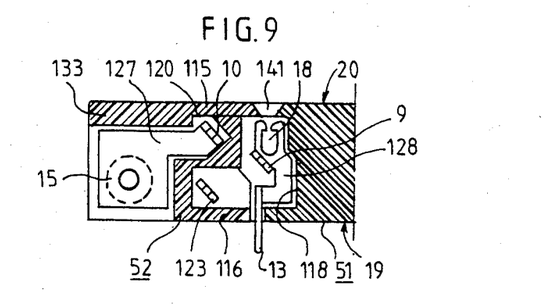
FIG. 9 shows a top view of a local section of FIG. 6 through the plane QQ'.

The pneumatic amplifier which has just been described and its various connecting ducts are located in one solid region 111 of the body 51 which is used in such a way that the fluid flow passages are substantial. This region 111 is close to a hollow region 112 lying between the wall 109 of the cover 52, between the staged walls 113, 114 which are perpendicular to the wall 109, between two shoulders 116, 115 of the covers parallel to faces 19, 20 of the socket 5, and between an end 117 of this socket which is substantially parallel to the face 29 (see FIGS. 4, 5 and 9).

In this hollow region, or this volume 112, are located the connecting devices 9, 10 and the third terminal 18, the first and second terminals 13 respectively 15 being located outside this volume so that they can be connected to a third terminal such as 18' of a neighboring stage and respectively to a conductor 16.

Figure 6:
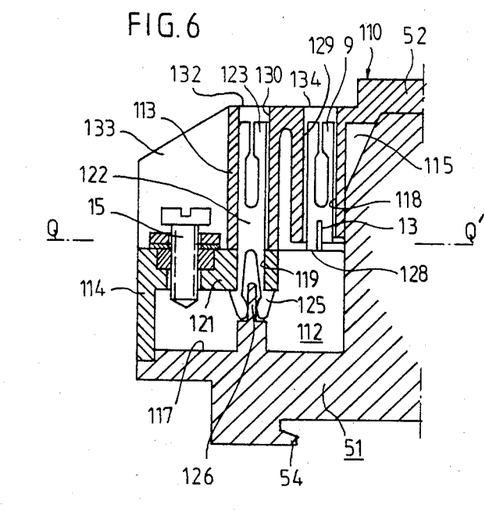

The connecting devices and the terminals (see FIGS. 6 and 9) will with advantage be arranged in the recesses 118, 119 120 of an insulating lid 52 such that this can be fitted with electrical components on a work station separate from that where the pneumatic components are fitted into the body of the socket. If the body 51 of the socket is itself made in plastics material, the terminals and connecting devices can be gripped between the lid and the body. If the body 51 of the socket is in pressure cast metal, these terminals and electrical connecting devices will be gripped between the lid 52 and a retaining part 121 or 121' mounted on it or clamped between the lid and the body 51 (see FIGS. 6 and 4). FIG. 4 shows a version of this kind, where it will be seen that an electrical connecting device 122 has two opposite flexible prongs one of which 123 interacts with an earth pin 124 of the electrical valve and the other 125 interacts with a tag 126 of the metallic body 51 to give electrical continuity up to the mounting rail 30 which is grounded.

The terminals and connecting devices will with advantage be supported by parts 127, 128 formed by cutting out and bending from a sheet in an appropriate conducting material, the connecting devices and terminals being located in corridors 129, 130 and protected by openings 131, 132, 134 in the lid or respectively by plates such as 133 (see FIGS. 4, 6, 9 and 10).

In the version according to FIGS. 4 and 5 the same non-return valve 88 protects the pneumatic switch 40 and the amplifier 57 against any possible rises in pressure caused by the discharge of fluids from neighbouring stages; these rises in pressure which are hazardous to the membrane owing to its relatively large diameter and which can therefore prevent its movements, are less dangerous to the pneumatic switch 40 owing to the small size of its moving parts.

Figure 11:
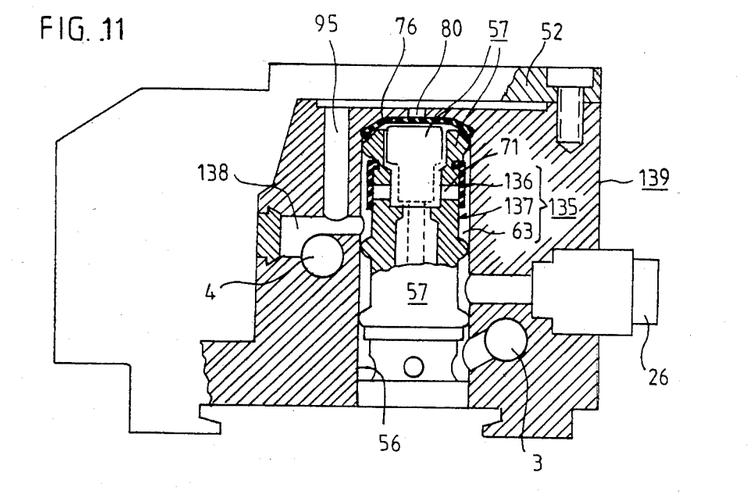
FIG. 11 is a section through PP' of part of a socket corresponding to a variant version of the invention.

In FIG. 11, a non-return valve 135 has been connected solely to the amplifier 57 in a socket 139; this non-return valve, which is formed by an elastomeric skirt 136 and which is resiliently pressed against the cylindrical surface 137 of the groove 63 of the pneumatic amplifier opposite the radial openings 71, can separate from these whenever a discharge pressure emerges from the opening 71, moves towards a duct 138 which is directly connected to the portion of discharge duct 4; in this figure the other components have the same functions as in the version shown in FIG. 4 and carry the same reference numbers.

Figure 12:
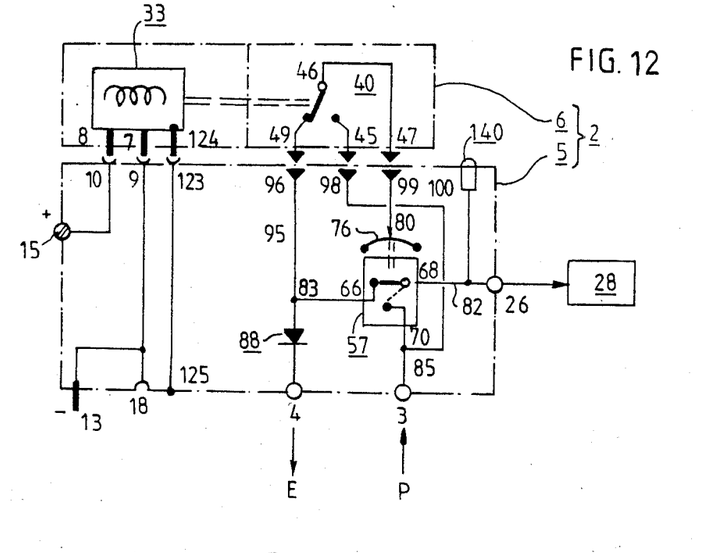
FIGS. 12 and 13 give schematic illustrations of the electrical and pneumatic circuits of the two versions.
Figure 13:
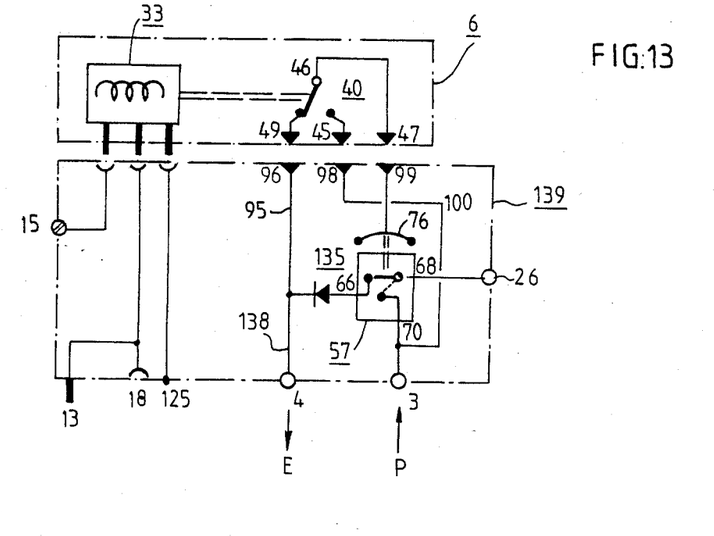

The operation of the two stages which use the two versions may be explained by FIGS. 3 and 5 and by two circuit diagrams FIGS. 12 and 13 where the pneumatic switch 40 and the amplifier 57 have been shown as electrical switches.

The feed pressure P being permanently applied at 3, this is available at the points 70 and 45 belonging to the amplifier 57 and respectively to the pneumatic switch 40. Since the electro-magnet 33 is not excited, the orifices 69 and respectively 43 are closed by the valve elements 75 respectively 41 (which are kept in the rest position by this pressure and respectively by the spring 42), the pneumatic connector 26 is connected to the discharge 4 by 68 and 66, as well as chamber 46 owing to the fact that the orifice 48 is opened by the spring 42 and the orifice 67 is opened by the valve element 74 such that no pressure can be transmitted either from the switch 40 to the membrane 76 nor from the portion of duct 3 to the switch 26.

When a control potential, for example, positive, is applied to terminal 15, while a negative potential is permanently applied to pin 13, the electro-magnet is excited and causes the pneumatic switch 40 to change state; the outlet 47 is then connected to the pressure inlet 45 and the pressure P is applied to the membrane 76 which moves the rod 73 of the amplifier 57; the orifice 69 is then opened by the valve element 75 which connects the pressure P to the connector 26 through the ducts 72 and 82 and the orifice 67 is closed by the valve element 74 which isolates chamber 68 from the discharge 4.

The installation 28 therefore receives a substantial fluid flow delivered by the pneumatic amplifier 57. Once the electrical control signal stops, the switch 40 returns to its rest position, no pressure is applied to the membrane 76 and the amplifier 57 in turn returns to the rest position; during this process, the compressed fluids in the pipe between the connector 26 and the installation 28 and respectively in the chamber 46 and in the duct 80 move into the portion of discharge duct 4, either through the non-return valve 88 (see FIGS. 5 and 12) or through the non-return valve 135 (see FIGS. 11 and 13).

The non-return valves 88 and respectively 135 permit the movements of the two discharges or respectively of the one discharge towards the duct 4.

Since this duct 4 is frequently transited by discharge fluid flow from neighbouring stages and since dangerous pressures could disturb the operation of the amplifiers owing to the small size of the stages, the non-return valves 88 or 135 in this way provide additional isolation.

A pressure tell-tale 140 connected to the duct 82 and hence to the pneumatic connector 26, may be fitted on the socket 2 in the region of the surface 110 not taken up by the electrical valve 6, in order to indicate to the maintenance staff the state of each amplifier.

Figure 10:
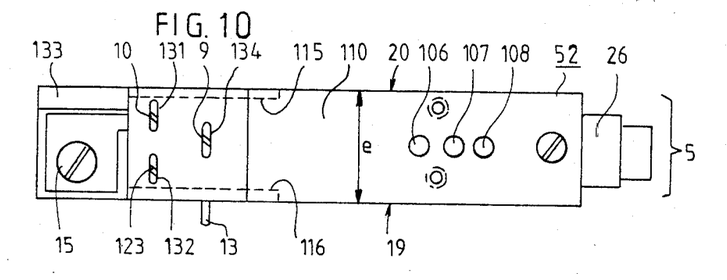
FIG. 10 is a top view of the socket according to FIGS. 5 and 6.
Figure 14:
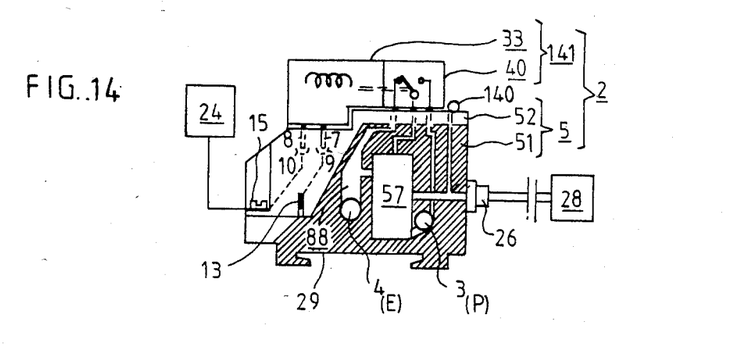
FIG. 14 is a schematic diagram of a stage of the system using one of the sockets according to the invention.

Owing to the principal features of the invention, fluid flows that are perfectly compatible with those of normal pneumatic control signals, and reduced heating have been obtained with sockets and hence with electrical valves, the longitudinal dimension "e" of which does not exceed 17.5 mm (see FIG. 10). The electromagnets used in electrical valves of very low consumption may generate a power of only 0.3 watt which is still enough to activate pneumatic switches capable of driving a pneumatic amplifier that responds rapidly to very low flows. FIG. 14 gives an overall diagram in which reference 141 is a low power electrical valve.

We claim:

1. System for distributing pneumatic control signals by electrical means comprising:
   (A) an elongated support element having a longitudinal axis and first securing means;
   (B) a plurality of adjacent base modules each having a first body comprising:
      a securing surface having second securing means adapted for engaging with and fixing on said first securing means;
      a first association surface opposite to the securing surface and substantially parallel thereto, said first association surface having a first and second lateral areas, said first lateral area being provided with first, second and third orifices;
      first and second opposite coupling surfaces which are parallel to each other and perpendicular to said axis said first coupling surface comprising first and second openings and said second coupling surface comprising first and second openings respectively coaxial to the first and second openings of the first coupling surface so that in coupling engagement of two base modules by the respective first and second coupling surfaces thereof, said first and second openings of one base module are respectively in communication with the first and second openings of a corresponding coupling surface of an adjacent base element;
      first and second opposite end surfaces respectively adjacent to said first and second lateral areas, said first end surface having an aperture provided with a pneumatic connection;
      a pressurized feed channel portion and a discharge channel portion respectively connecting together said first and second openings of said first and second coupling surfaces through the base element, said pressurized feed channel portion and said discharge channel portion being respectively connected to said first and second orifices of said association surface;
      a pneumatic amplifier located inside said body and comprising a pressurized feed inlet connected to said pressurized feed channel portion, a discharge outlet connected to said discharge channel portion, a service outlet connected to said pneumatic connection and a control inlet connected to the third orifice of said association surface, and obturating means actuated from the pressure occuring at the control inlet in such a way as to connect said service outlet directly to the said pressurized feed inlet when pressure at the control inlet is higher than a predetermined pressure level and to connect said service outlet to the discharge outlet when pressure at the control inlet is lower than said predetermined level;
   (C) a plurality of electromagnetic valve modules each comprising:
      a second body having a second association surface adapted to be adjusted onto said first association surface of one corresponding base element in a coupling arrangement and including an inlet opening, an outlet opening, an exhaust opening so that in said coupling arrangement, said inlet orifice, said exhaust opening and said outlet opening communicate respectively with said first, second and third orifices of said first association surface of the base module;
      a control electromagnet located in said second body and having a coil, a movable armature having at least first and second positions, valve means including actuation means connected to said armature, a pressure duct connected to said inlet opening, a first exhaust duct connected to said exhaust opening, an outlet duct connected to said outlet opening and a valve member controlled by said actuation means for connecting said outlet duct with said pressure duct when said armature is in the first position and for connecting said outlet duct with said first exhaust duct when said armature is in said second position;
      said second lateral area of said first association surface comprising at least first and second windows;
      said second coupling surface of each base module comprising a third window;
      first and second electrical female coupling members being located in each base element and respectively debouching into said first and second windows, perpendicularly to said first association surface and a third female electrical coupling member being located in the base module and debouching into said third window perpendicularly to said second coupling surface;

said second end surface being provided with an electrical connection device;

said first electrical coupling member being connected to said electrical connection device by electrical conducting means passing through said base module;

said second electrical coupling member being connected to said third female coupling member by a conducting piece which has a male electrical coupling member projecting beyond said first coupling surface parallel to said longitudinal axis and coaxially to said third female member so that in mutual engagement of two adjacent base modules, the male electrical coupling member can penetrate into said third female electrical coupling member said second association surface of electromagnetic valve modules comprising at least first and second electrical connection terminals connected to said coil and projecting from said second surface so that in said coupling arrangement, said first and second electrical connection terminals are electrically coupled with said first and second electrical coupling members of said base element.

2. System according to claim 1 in which said base module comprises a second exhaust duct perpendicular to said securing surface, which connects said discharge channel portion respectively to said discharge outlet of said pneumatic amplifier and to said second orifice of the association surface, said second exhaust duct being provided with a non return valve which prevents circulation of fluid towards the pneumatic amplifier and towards said electromagnetic valve.

3. System according to claim 2 in which said non return valve comprises an annular elastic skirt the periphery of which bears against the inner surface of said second exhaust duct, and a support element located inside said second exhaust duct and having a first end portion on which is maintained said elastic skirt and a second end portion acting as a plug in said second exhaust duct.

4. System according to claim 2 in which said discharge duct comprises an opening debouching on said securing surface and a plug which is engaged in said opening.

5. System according to claim 1 in which said pneumatic amplifier comprises:

a cylindrical chamber provided in said first body and having a revolution axis perpendicular to said securing surface and said first association surface, and first and second end surfaces;

a cylindrical body located in said cylindrical chamber and having a cylindrical surface with three annular ridges separated by two annular successive grooves forming with said cylindrical chamber first and second annular chambers which respectively communicate with said discharge outlet and said service outlet, and an internal co-axial recess which passes therethrough and which comprises first and second end cavities forming with said first and second surfaces, first and second end. chambers which communicate respectively with said pressurized feed inlet and said control inlet, and an intermediate chamber communicating with said first and second end chambers;

obturating means comprising first and second obturating members respectively located in said first and second chambers and connected therebetween by a connecting piece which passes through said intermediate chamber, said obturating means being axially movable between a first position in which said first obturating member is in obturating engagement with said intermediate chamber and a second position in which said second obturating member obturates said intermediate chamber;

first passage means between said first end chamber and said first annular chamber and second passage means between said intermediate chamber and said second annular chamber, and a deformable membrane sealingly mounted in the cylindrical chamber and extending through said first end chamber and acting on said first obturating member so that when a pressure is transmitted through the control inlet, said membrane urges said first obturating member to obturate said intermediate chamber.

6. System for distributing pneumatic control signals by electrical means comprising:

(A) an elongate support element having a longitudinal axis and first securing means:

(B) a plurality of adjacent base modules each having a first body comprising:

a securing surface having second securing means adapted for engaging with and fixing on said first securing means;

a first association surface opposite to the securing surface and substantially parallel thereto, said first association surface having first and second lateral areas, said first lateral area being provided with first, second and third orifices;

first and second opposite coupling surfaces which are parallel to each other and perpendicular to said axis, said first coupling surface comprising first and second openings and said second coupling surface comprising first and second openings respectively coaxial to the first and second openings of the first coupling surface so that in coupling engagement of two base modules by the respective first and second coupling surface thereof, said first and second openings of one base module are respectively in communication with the first and second openings of a corresponding coupling surface of an adjacent base element;

first and second opposite end surfaces respectively adjacent to said first and second lateral areas, said first end surface having an aperture provided with a pneumatic connection;

a pressurized feed channel portion and a discharge channel portion respectively connecting together said first and second openings of said first and second coupling surfaces through the base element, said pressurized feed channel portion and said discharge channel portion being respectively connected to said first and second orifices of said association surface;

a pneumatic amplifier located inside said body and comprising a pressurized feed inlet connected to said pressurized feed channel portion, a discharge outlet connected to said discharge channel portion, a service outlet connected to said pneumatic connection and a control inlet connected to the third orifice of said association surface, and obturating means actuated from the pressure occuring at the control inlet in such a way as to connect said service outlet directly to the said pressurized feed inlet when pressure at the control inlet is higher than a predetermined pressure level and to connect said service outlet to the discharge outlet when pressure at the control inlet is lower that said predetermined level;

(C) a plurality of electromagnetic valve modules each comprising:

a second body having a second association surface adapted to be adjusted onto said first association surface of one corresponding base element in a coupling arrangement and including an inlet opening, an outlet opening, an exhaust opening so that in said coupling arrangement, said inlet orifice, said exhaust opening and said outlet opening communicate respectively with said first, second and third orifices of said first association surface of the base module;

a control electromagnet located in said second body and having a coil, a movable armature having at least first and second positions, valve means including actuation means connected to said armature, a pressure duct connected to said inlet opening, a first exhaust duct connected to said exhaust opening, an outlet duct connected to said outlet opening and a valve member controlled by said actuation means for connecting said outlet duct with said pressure duct when said armature is in the first position and for connecting said outlet duct with said first exhaust duct when said armature is in said second position, said base module comprising a second exhaust duct perpendicular to said securing surface, which connects said discharge channel portion respectively to said discharge outlet of said pneumatic amplifier and to said second orifice of the association surface, said second exhaust duct being provided with a non return valve which prevents circulation of fluid towards the pneumatic amplifier and towards said electromagnetic valve, said non return valve comprising an annular elastic skirt the periphery of which bears against the inner surface of said second exhaust duct, and a support element located inside said second exhaust duct having a first end portion on which is maintained said elastic skirt and a second end portion acting as a plug in said second exhaust duct.

7. System for distributing pneumatic control signals by electrical means comprising:

(A) an elongate support element having a longitudinal axis and first securing means;

(B) a plurality of adjacent base modules each having a first body comprising:

a securing surface having second securing means adapted for engaging with and fixing on said first securing means;

a first association surface opposite to the securing surface and substantially parallel thereto, said first association surface having first and second lateral areas, said first lateral area being provided with first, second and third orifices;

first and second opposite coupling surfaces which are parallel to each other and perpendicular to said axis, said first coupling surface comprising first and second openings and said second coupling surface comprising first and second openings respectively coaxial to the first and second openings of the first coupling surface so that in coupling engagement of two base modules by the respective first and second coupling surface thereof, said first and second openings of one base module are respectively in communication with the first and second openings of a corresponding coupling surface of an adjacent base element;

first and second opposite end surfaces respectively adjacent to said first and second lateral areas said first end surface having an aperture provided with a pneumatic connection;

a pressurized feed channel portion and a discharge channel portion respectively connecting together said first and second openings of said first and second coupling surfaces through the base element, said pressurized feed channel portion and said discharge channel portion being respectively connected to said first and second orifices of said association surface;

a pneumatic amplifier located inside said body and comprising a pressurized feed inlet connected to said pressurized feed channel portion, a discharge outlet connected to said discharge channel portion, a service outlet connected to said pneumatic connection and a control inlet connected to the third orifice of said association surface, and obturating means actuated from the pressure occuring at the control inlet in such a way as to connect said service outlet directly to the said pressurized feed inlet when pressure at the control inlet is higher than a predetermined pressure level and to connect said service outlet to the discharge outlet when pressure at the control inlet is lower than said predetermined level;

(C) a plurality of electromagnetic valve modules each comprising:

a second body having a second association surface adapted to be adjusted onto said first association surface of one corresponding base element in a coupling arrangement and including an inlet opening, an outlet opening, an exhaust opening so that in said coupling arrangement, said inlet orifice, said exhaust opening and said outlet opening communicate respectively with said first, second and third orifices of said first association surface of the base module;

a control electromagnet located in said second body and having a coil, a movable armature having at least first and second positions, valve means including actuation means connected to said armature, a pressure duct connected to said inlet opening, a first exhaust duct connected to said exhaust opening, an outlet duct connected to said outlet opening and a valve member controlled by said actuation means for connecting said outlet duct with said pressure duct when said armature is in the first position and for connecting said outlet duct with said first exhaust duct when said armature is in said second position, said pneumatic amplifier further comprising, a cylindrical chamber provided in said first body and having a revolution axis perpendicular to said securing surface and said first association surface, and first and second end surfaces;

a cylindrical body located in said cylindrical chamber and having a cylindrical surface with three annular ridges separated by two annular successive grooves forming with said cylindrical chamber first and second annular chambers which respectively communicate with said discharge outlet and said service outlet, and an internal coaxial recess which passes therethrough and which comprises first and second end cavities forming with said first and second surfaces, first and second end chambers which communicate respectively with said pressurized feed inlet and said control inlet, and an intermediate chamber communicating with said first and second end chambers;

obturating means comprising first and second obturating members respectively located in said first and second chambers and connected therebetween by a connecting piece which passes through said intermediate chamber, said obturating means being axially movable between a first position in which said first obturating member is in obturating engagement with said intermediate chamber and a second position in which said second obturating member obturates said intermediate chamber;

first passage means between said first end chamber and said first annular chamber and second passage means between said intermediate chamber and said second annular chamber, and a deformable membrane sealingly mounted in the cylindrical chamber and extending through said first end chamber and acting on said first obturating member so that when a pressure is transmitted through the control inlet, said membrane urges said obturating member to obturate said intermediate chamber.

* * * * *